(No Model.)

H. N. LEE.
INDIA RUBBER TIRE.

No. 487,419. Patented Dec. 6, 1892.

Witnesses.

Inventor.

H. N. Lee

UNITED STATES PATENT OFFICE.

HENRY NAPIER LEE, OF LONDON, ENGLAND.

INDIA-RUBBER TIRE.

SPECIFICATION forming part of Letters Patent No. 487,419, dated December 6, 1892.

Application filed January 12, 1892. Serial No. 417,833. (No model.) Patented in England June 27, 1891, No. 10,987; in Belgium January 4, 1892, No. 97,797, and in France January 4, 1892, No. 218,441.

*To all whom it may concern:*

Be it known that I, HENRY NAPIER LEE, a subject of the Queen of Great Britain, residing at London, England, have invented new and useful Improvements in India-Rubber Tires and in the Methods of Making the Same, (patented in Great Britain, No. 10,987, dated June 27, 1891; in Belgium, No. 97,797, dated January 4, 1892, and in France, No. 218,441, dated January 4, 1892,) of which the following is a specification.

My invention relates more particularly to india-rubber tires for the wheels of bicycles and other velocipedes; and it consists, essentially, in manufacturing such tires with internal cells containing compressed air or gas, the said cells being thereby permanently inflated.

To enable my invention to be fully understood, I will describe the same by reference to the accompanying drawings, in which—

Figure 1:
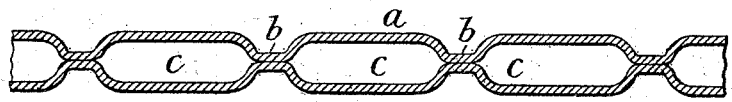
Figure 2:
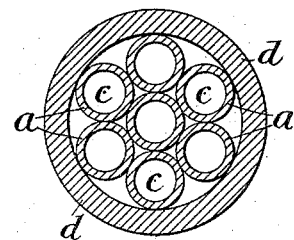
Figure 3:
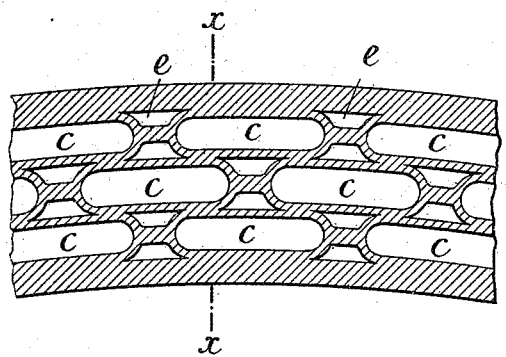

Figure 1 is a longitudinal section through one of the tubes composing the tire; Fig. 2, a cross-section through a tire composed of such tubes and an outer covering; Fig. 3, a longitudinal section of a portion of a finished tire, and Fig. 4 a transverse section of the same.

In carrying out my invention I take a number of tubes $a$, of unvulcanized india-rubber in a soft or plastic condition, and fill the same with compressed air, preferably at a low temperature. Each tube is then compressed or indented at intervals, (for instance, as at $b\,b$, Fig. 1, which is a longitudinal section through one of the said tubes,) so as to divide the tube into a number of cells $c\,c$. A number of such inflated tubes are now placed together in the from of a cable, and around the same is tightly drawn an outer covering $d$, also of unvulcanized india-rubber, as shown in Fig. 2, which is a transverse section through such tubes and outer covering. The tire thus far formed is considerably larger than the finished tire is required to be. The two ends of this unfinished tire are now joined together and the tire is introduced into a vulcanizing-mold in such a manner that when the two parts of the mold are brought together the diameter of the tire will be considerably reduced and at the same time the air contained in the cells will be further compressed. The tire is now vulcanized in the ordinary manner, so that the india-rubber of the various tubes and of the outer covering is amalgamated.

Figure 4:
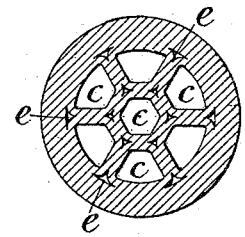

Fig. 3 shows a longitudinal section of a portion of a finished tire; and Fig. 4 is a transverse section on the line $x\,x$, Fig. 3.

In Figs. 3 and 4 it will be noticed that spaces $e\,e$ are formed between the tubes forming the tire; but in practice it is found that, owing to the compression of the tire in the vulcanizing-mold, these spaces are entirely filled up or are of exceedingly small dimensions.

By my invention I produce a tire which is considerably lighter than an ordinary cushion-tire or a pneumatic tire, and which requires no inflation and will not collapse nor have its elasticity materially affected if punctured. Besides which, in consequence of the air being retained in the portion of the tire bearing the weight, instead of being forced away by the compression, as it is in a cushion-tire, greater elasticity is secured.

Having now particularly described and ascertained the nature of my said invention and in what manner the same is to be performed, I declare that what I claim is—

1. The described compound tire, consisting of a series of tubes, each having a series of cells filled with compressed air or gas and each having a series of indented and united parts, as shown and described, the whole being inclosed in an outer covering and further reduced by being compressed and then finally vulcanized.

2. The described method of forming a tire having a series of cells filled with compressed air or gas, consisting in inflating a series of tubes with compressed air, forming indentations in the said tubes, and then inclosing a number of the same in an outer covering, the whole being then compressed into a mold and vulcanized, substantially in the manner described.

HENRY NAPIER LEE.

Witnesses:
    JOHN E. BOUSFIELD,
*Of the firm of G. F. Redfern & Co., 4 South Street, Finsbury, London, Patent Agents.*
    W. C. BROKENSHIRE.